United States Patent
Cazarez Aguilar et al.

(10) Patent No.: US 10,592,371 B2
(45) Date of Patent: Mar. 17, 2020

(54) COGNITIVE TESTING CONFIGURATION ACCORDING TO DYNAMIC CHANGES IN AN INSTALL-BASE

(71) Applicant: International Business Machines Corporation, Armonk, NY (US)

(72) Inventors: Josue Cazarez Aguilar, Jalisco (MX); Micah Robison, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 86 days.

(21) Appl. No.: 15/935,221

(22) Filed: Mar. 26, 2018

(65) Prior Publication Data

US 2019/0294517 A1 Sep. 26, 2019

(51) Int. Cl.
| | |
|---|---|
| *G06F 11/00* | (2006.01) |
| *G06F 11/28* | (2006.01) |
| *G06F 11/36* | (2006.01) |
| *G06F 11/22* | (2006.01) |
| *G06N 5/02* | (2006.01) |

(52) U.S. Cl.
CPC .......... *G06F 11/28* (2013.01); *G06F 11/2273* (2013.01); *G06F 11/3684* (2013.01); *G06N 5/022* (2013.01)

(58) Field of Classification Search
CPC ....... G06F 11/28; G06F 11/2273; G06F 11/26
See application file for complete search history.

(56) References Cited

U.S. PATENT DOCUMENTS

| | | | |
|---|---|---|---|
| 6,275,867 B1 | 8/2001 | Bendert et al. | |
| 7,903,625 B1 | 3/2011 | Srinivas et al. | |
| 8,312,117 B1 | 11/2012 | Magnotta et al. | |
| 8,874,848 B2 | 10/2014 | Soundararajan et al. | |
| 9,317,404 B1 * | 4/2016 | Cohen ................. | G06F 11/3684 |
| 9,317,407 B2 | 4/2016 | Sabin et al. | |
| 9,354,943 B2 | 5/2016 | Bose et al. | |
| 9,471,471 B2 | 10/2016 | Champlin-Scharff et al. | |
| 9,588,820 B2 | 3/2017 | Ravi et al. | |
| 2002/0078080 A1 | 6/2002 | Bierbrauer et al. | |

(Continued)

FOREIGN PATENT DOCUMENTS

| | | |
|---|---|---|
| CN | 104778118 A | 7/2015 |
| EP | 1891523 A2 | 5/2005 |

(Continued)

OTHER PUBLICATIONS

Rothermel et al., "Analyzing Regression Test Selection Techniques", Aug. 1996, IEEE Transactions of Software Engineering, vol. 22, No. 8, pp. 529-551 (Year: 1996).*

(Continued)

*Primary Examiner* — Michael Maskulinski
(74) *Attorney, Agent, or Firm* — Garg Law Firm, PLLC; Rakesh Garg; Alexander Jochym (57) ABSTRACT

In a workload data, a pattern of usage of an aspect of a product is detected in a production system. The pattern is apportioned into a portion. When a test has a characterization that corresponds to the portion within a tolerance, the test is configured in a test bucket. The product is caused to be tested using the test bucket, the test bucket including a set of tests such that the set of tests collectively correspond to the pattern within the tolerance.

18 Claims, 6 Drawing Sheets

(56) References Cited

U.S. PATENT DOCUMENTS

| | | |
|---|---|---|
| 2006/0080625 A1 | 4/2006 | Bose et al. |
| 2006/0271544 A1 | 11/2006 | Devarakonda et al. |
| 2007/0219944 A1 | 9/2007 | Liu et al. |
| 2009/0006529 A1 | 1/2009 | Singh et al. |
| 2009/0089554 A1 | 4/2009 | Blackmon et al. |
| 2009/0235268 A1 | 9/2009 | Seidman et al. |
| 2009/0313631 A1 | 12/2009 | De Marzo et al. |
| 2010/0050008 A1 | 2/2010 | Allalouf et al. |
| 2010/0169253 A1 | 7/2010 | Tan |
| 2010/0186018 A1 | 7/2010 | Bell, Jr. et al. |
| 2011/0295995 A1 | 12/2011 | Diao et al. |
| 2012/0131181 A1 | 5/2012 | Birkler et al. |
| 2013/0086324 A1 | 4/2013 | Soundararajan et al. |
| 2013/0185729 A1 | 7/2013 | Vasic et al. |
| 2013/0254742 A1* | 9/2013 | Hockings .................. G06F 8/70 717/120 |
| 2013/0311962 A1 | 11/2013 | Chatterjee et al. |
| 2015/0268710 A1 | 9/2015 | Bose et al. |
| 2015/0379420 A1 | 12/2015 | Basak et al. |
| 2016/0055020 A1 | 2/2016 | Jacobs et al. |
| 2016/0057074 A1 | 2/2016 | Jacobs et al. |
| 2016/0140032 A1* | 5/2016 | Bender .............. G06F 11/3692 717/126 |
| 2016/0285966 A1 | 9/2016 | Brech et al. |
| 2017/0093684 A1* | 3/2017 | Jayaraman ................ G06F 8/71 |

FOREIGN PATENT DOCUMENTS

| | | |
|---|---|---|
| WO | 2003045035 A2 | 11/2001 |
| WO | 2006130170 A2 | 5/2005 |
| WO | 2013048573 A1 | 9/2011 |

OTHER PUBLICATIONS

Onoma et al., "Regression Testing in an Industrial Environment", May 1998, Communications of the ACM, vol. 41, No. 5, pp. 81-86 (Year: 1998).*

Avritzer et al., "Software Performance Testing Based on Workload Characterization", Jul. 24-26, 2002, WOSP '02 Rome, Italy, pp. 17-24 (Year: 2002).*

Walton et al., Statistical Testing of Software Based on a Usage Model, Jan. 1995, Software—Practice and Experience, vol. 25(1), pp. 97-108 (Year: 1995).*

* cited by examiner

COGNITIVE TESTING CONFIGURATION ACCORDING TO DYNAMIC CHANGES IN AN INSTALL-BASE

TECHNICAL FIELD

The present invention relates generally to a method, system, and computer program product for effectively testing products and systems. More particularly, the present invention relates to a method, system, and computer program product for cognitive testing configuration according to dynamic changes in an install-base of a product.

BACKGROUND

Hereinafter, a "product" is any software, hardware, or combination of hardware and software, that is packaged, sold, installed, or otherwise deployed in a customer environment. A "customer environment" is a data processing system or data processing environment where a user of the product installs the product for a production use of the product. A "production" use, system, or environment is a use, system, or environment, in which actual data transactions, not testing or sandbox transactions, are performed. A production use, system, or environment occurs or is configured in a customer environment.

A product generally includes numerous features. In many cases, a product, which is feature-rich, can also be deployed in numerous ways in a customer environment. Furthermore, a deployed product in a customer environment can be subjected to a variety of workloads, which can potentially utilize the product in numerous different ways.

A product manufacturer generally attempts to test the product and product features as thoroughly as commercially possible before deploying the product in a customer environment. The testing process generally utilizes one or more test cases that exercise, or provide coverage of, certain product features. In many cases, it is not possible or desirable, at least commercially, to test every single feature, feature combination, utilization scenarios, or configuration, which might be possible for a given product.

Presently, a manufacturer selects a set of features, feature combinations, utilization scenarios, and/or configurations to test with a product. Upon obtaining desirable test results, the manufacturer deems the product fit for deployment. An install-base is a collection of customer environments in which a product is deployed in some manner.

SUMMARY

The illustrative embodiments provide a method, system, and computer program product. An embodiment includes a method that detects, in a workload data, a pattern of usage of an aspect of a product in a production system. The embodiment apportions the pattern into a portion. The embodiment configures, responsive to a test having a characterization that corresponds to the portion within a tolerance, the test in a test bucket. The embodiment causes the product to be tested using the test bucket, wherein the test bucket comprises a set of tests such that the set of tests collectively correspond to the pattern within the tolerance.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that testing products is a complex and cost-intensive process. It is often the case that only some features, feature combinations, utilization scenarios, and/or deployment configurations of a product are tested in a test environment before the product is regarded as ready for deployment.

The illustrative embodiments recognize that in this presently-used testing practice, some features, feature combinations, utilization scenarios, and/or deployment configurations (collectively and interchangeably referred to herein as "aspects") of a product may remain partially tested, untested, or even unrecognized. Such untested, partially tested, or unrecognized aspects of the product become known when a deployment suffers a problem, or when a customer expresses dissatisfaction with the product pertaining to the aspect in question.

The illustrative embodiments recognize that such case-by-case detection of issues with an aspect of a product is insufficient and ineffective. For example, a problem experienced by one customer may not occur in another customer's environment. As another example, a problem might manifest only when a certain pattern of product usage occurs, and such pattern may be scattered across different usages by different workloads and customer environments. As another example, an aspect might be identifiable in a change in the patterns over a period—i.e., a trend, such as a trend in a feature usage or a system configuration. Such trends may not be readily identifiable by present methodology of testing with pre-determined tests or case-by-case problem solving.

The illustrative embodiments also recognize that product development also suffers a parallel problem. Presently, the features to be developed are identified and built from a specification. The specification is often developed from customer surveys, known problem fixes, and engineering decisions. Patterns of feature usage, system configuration, features used in combinations, utilization scenarios, and/or deployment configurations (collectively and interchangeably referred to herein as "patterns") of a product can provide valuable insight into how a product is being used in real and dynamic customer environments. Trends in shifts of those patterns can drive not only testing changes but also changes in product development—such as changing feature priorities for development, inclusion or exclusion of features to be developed, and many others.

The illustrative embodiments recognize that the presently available tools or solutions do not address these needs/problems or provide adequate solutions for these needs/problems. The illustrative embodiments used to describe the invention generally address and solve the above-described problems and other related problems by cognitive testing configuration according to dynamic changes in an install-base of a product.

An embodiment can be implemented as a software application. The application implementing an embodiment, or one or more components thereof, can be configured as a modification of an existing product testing system—i.e., a native application in the testing system, as an application executing in a data processing system communicating with an existing testing system over a short-range radio network such as Bluetooth, over a wired or wireline local area network (LAN)—i.e., a local application on the LAN, as an application executing in a data processing system communicating with an existing testing system over a wide area network (WAN)—i.e., a remote application on the WAN, as a separate application that operates in conjunction with an existing testing system in other ways, a standalone application, or some combination thereof.

A cognitive system is an artificial intelligence application executing on data processing hardware. Cognitive systems are in a category of technologies that uses natural language processing, machine learning, and other techniques to enable recognition of hidden data or implications in a given collection of input data. These systems learn from an available body of knowledge (knowledgebase) and answer questions and queries pertaining to the subject-matter domain of the knowledgebase by analyzing the relationships and significant aspects that are expressed in or inferable from the given data based on the knowledgebase. For example, a knowledgebase of a domain can include product features, configurations, and other aspects, along with test data from previous testing of the product.

The illustrative embodiments recognize that a cognitive system can be configured to determine patterns in the workload characteristics data obtained from one or more customer environments. Workload characteristics data is data obtained from a customer environment and descriptive of features, feature combinations, utilization scenarios, deployment configurations, and/or other aspects of a product that are being used relative to the product in the customer environment. The illustrative embodiments further recognize that the cognitive system can be configured to analyze the workload characteristics data to determine a trend in the patterns, i.e., a change in the patterns over periods of time, over product versions, or over other variables.

Similarly, the illustrative embodiments recognize that a cognitive system can be configured to characterize a test or a test bucket based on test data. A test bucket is a collection of tests, or test case executables, arranged in a desired organization. The organization of tests in a test bucket can take the form of one or more sequences, one or more trees, conditional branching in a sequence or a tree to another sequence or tree or both, or some combination thereof. Test data is data resulting from the execution of a test case or a test bucket on the product in a testing environment.

It is assumed that a product and/or customer environment participating in an illustrative embodiment is instrumented with suitable data collection and transmission agents. Using such an agent, an embodiment collects workload characteristics data about a product form a customer environment. The illustrative embodiment collects workload characteristics data from several customer environments in this manner. The embodiment stores the collected workload characteristics data in a repository, such as in a database or other suitable structure in the repository.

The collection and storage of the workload characteristics data from the products configured in customer environments can be automatic through such agents. Furthermore, the agents can be configured to transmit this data continuously, at preset periods, upon the occurrence of certain events, or some combination thereof. Such a manner of transmission, collection, and storage of the workload characteristics data is useful not only for the described operations, but other similarly purposed operations for gaining other insights into the dynamic changes in the product deployment and use in customer environments.

An embodiment configures a cognitive system to analyze the collected workload characteristics data and identify one or more patterns pertaining to one or more aspects of the product from the workload characteristics data. The embodiment further configures the cognitive system to detect a trend in the patterns over a selected variable. The detection of the patterns and trends can be configured to be specific to a customer environment or across multiple customer environments. The patterns and trends identified in the workload characteristics data characterize the workloads which use the product in the customer environment or environments.

An embodiment further configures the cognitive system to analyze a collection of test data and identify one or more patterns pertaining to one or more aspects of the product that have been tested in that test data. The embodiment further configures the cognitive system to detect a trend in the patterns in the test data over a selected variable. The detection of the patterns and trends can be configured to be specific to a test or a test bucket. The patterns and trends identified in the test data characterize the test or the test bucket to which the test data pertains.

An embodiment matches a pattern extracted from the workload characteristics data to a characterized test or test bucket. In other words, the embodiment determines whether the aspects of the product that are used in the pattern also appear in a similar pattern in some test data of some test or test bucket. The matching of patterns can be configured to be within a matching tolerance. The matching attempts to determine whether the pattern seen in the workload characteristics data from one or more customer environments have been tested by a test bucket.

An embodiment further uses a forecasting component to forecast a pattern from a trend detected in the workload characteristics data. A forecasted pattern is a pattern that is expected to occur in the future workload characteristics data given the patterns and trend detected in the given workload characteristics data. As described with respect to a pattern detected in a given workload characteristics data, a forecasted pattern can also be used in the matching with a characterized test or test bucket to determine whether the forecasted pattern has been tested by a test bucket.

If the matching fails to identify a test bucket that sufficiently matches the pattern of the workload characteristics data, an embodiment identifies a test that matches a portion of the pattern. The embodiment decomposes the pattern in to several portions and identifies one or more tests to match one or more portions of the pattern. The embodiment constructs a test bucket from the identified tests such that the newly constructed test bucket includes a set of tests that together, as arranged in the test bucket, match the pattern from the workload characteristics data within the specified tolerance.

An embodiment may also optionally configure or reconfigure a test environment to execute the newly configured test bucket. For example, if the pattern requires n physical or virtual machines sharing m workloads that exhibit certain utilization patterns, then the embodiment may configure n physical or virtual machines sharing m test workloads that exhibit the utilization patterns observed in the pattern from the workload characteristics data. The embodiment causes the newly constructed test bucket to execute on the existing or newly configured or reconfigured test environment.

Under certain circumstances, no preconfigured test might sufficiently match a portion of a pattern from the workload characteristics data. In such a case, a new test case may have to be constructed, such as to exercise the feature combination or configuration in the pattern portion. In such a case, an embodiment outputs the pattern as whole or the portion in question. The pattern or the portion thereof is usable by testing personnel in constructing a new test case which would cover the feature or configuration found in the pattern or portion being output from the embodiment. The embodiment then includes the newly constructed test into a newly constructed test bucket to provide test coverage according to the pattern from the workload characteristics data.

Within the scope of the illustrative embodiments, a newly constructed test may be a reconfigured existing test. Similarly, a newly constructed test bucket may be a reconfigured existing test bucket; and a newly configured test environment may be a reconfigured existing test environment.

The manner of cognitive testing configuration according to dynamic changes in an install-base of a product described herein is unavailable in the presently available methods in the technological field of endeavor pertaining to software and hardware products testing and development. A method of an embodiment described herein, when implemented to execute on a device or data processing system, comprises substantial advancement of the functionality of that device or data processing system in dynamically preparing and conducting testing according to an actual pattern of usage of the product. The illustrative embodiments improve an existing system for testing products by providing an automated feedback of actual workload information to the testing system, thus enabling the testing system to analyze the install-base of the product and make informed decision about allocating resources to pattern-specific test development and pattern-specific testing according to the diversity or commonality of patterns of product usage existing the install-base.

The illustrative embodiments are described with respect to certain types of products, environments, features, aspects, tests, test buckets, patterns, trends, locations of embodiments, data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
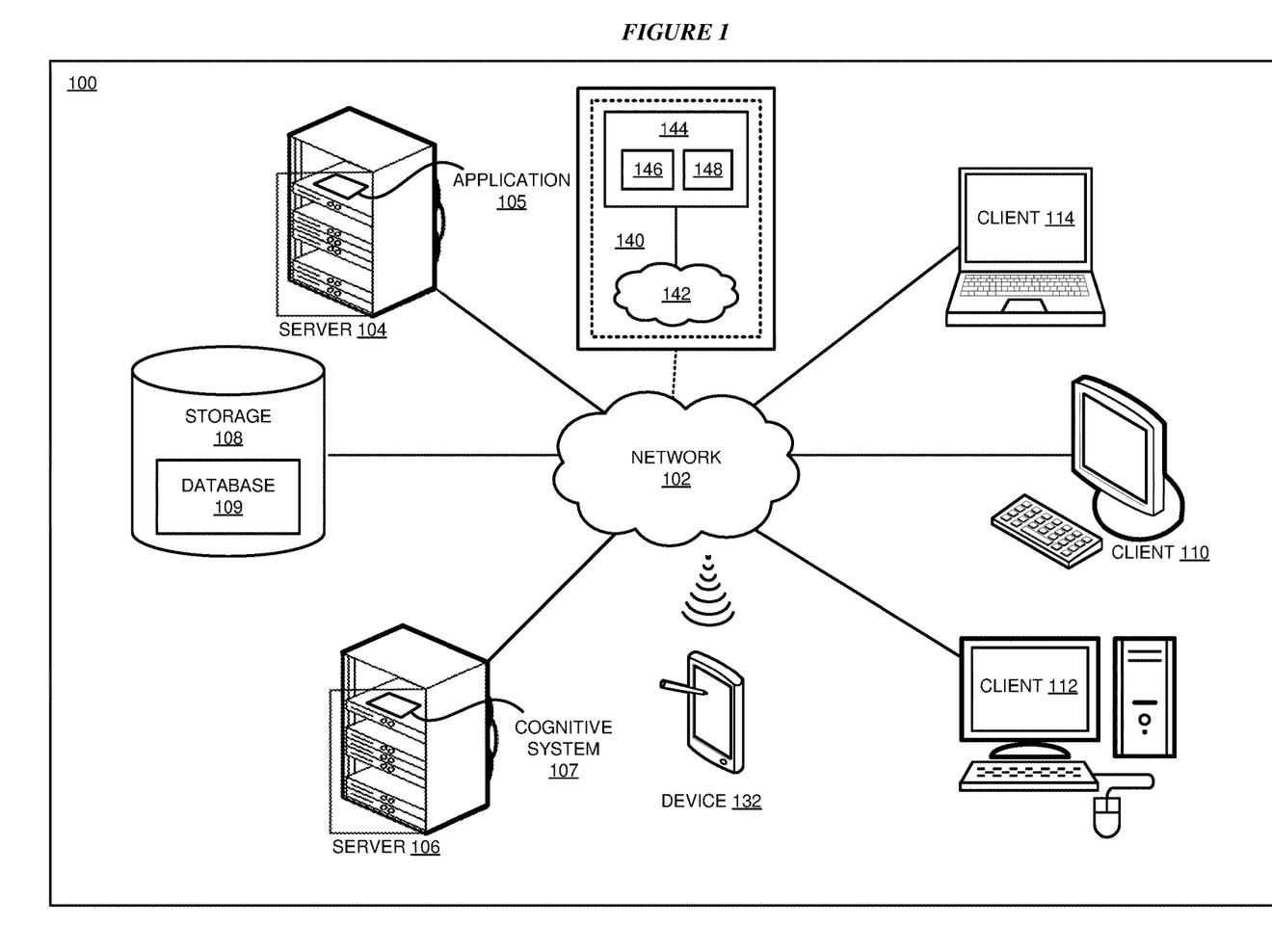
FIG. 1 depicts a block diagram of a network of data processing systems in which illustrative embodiments may be implemented.
Figure 2:
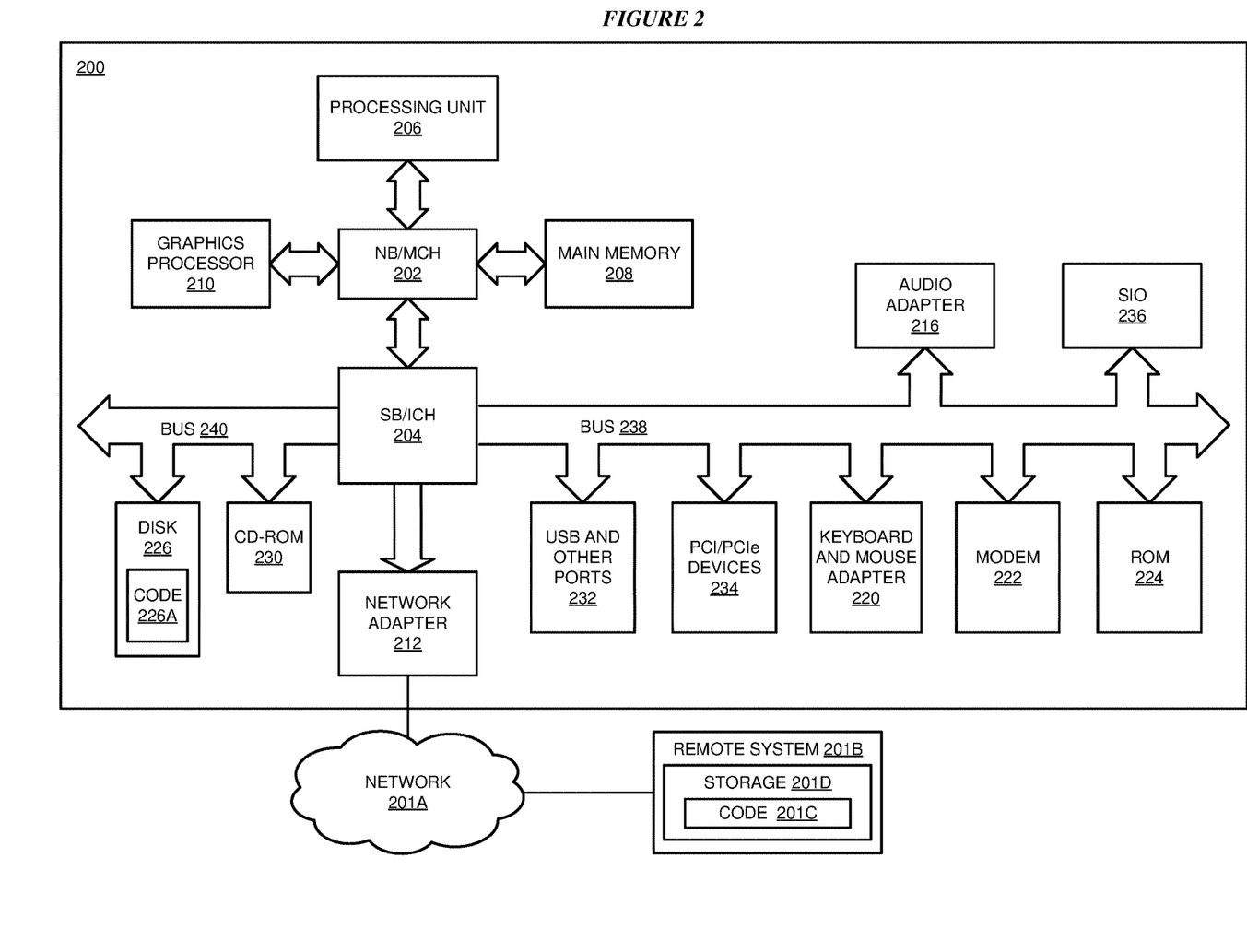
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Data processing environment 140 is an example of a customer environment. Production system 144 in environment 140 executes product 146. Workload 148 uses product 146. Workload characteristics data from customer environment 140 is communicated over customer's network 142 to network 102. For the purposes of this example configuration, data processing environment 100 is a data processing environment of the manufacturer of product 146 in which testing of product 146 can be configured as described herein.

Application 105 implements an embodiment described herein. Application 105 uses cognitive system 107 to detect patterns and trends in the workload characteristics data obtained from customer environment 140. Application 105 also uses cognitive system 107 to characterize tests and test buckets as described herein.

The workload characteristics data obtained from customer environment 140 is saved in database or other suitable structure 109 in repository 108. One or more patterns and trends from the workload characteristics data and from the test characterization can also be stored in repository 108 in another structure, such as for historical trend analysis.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/

PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
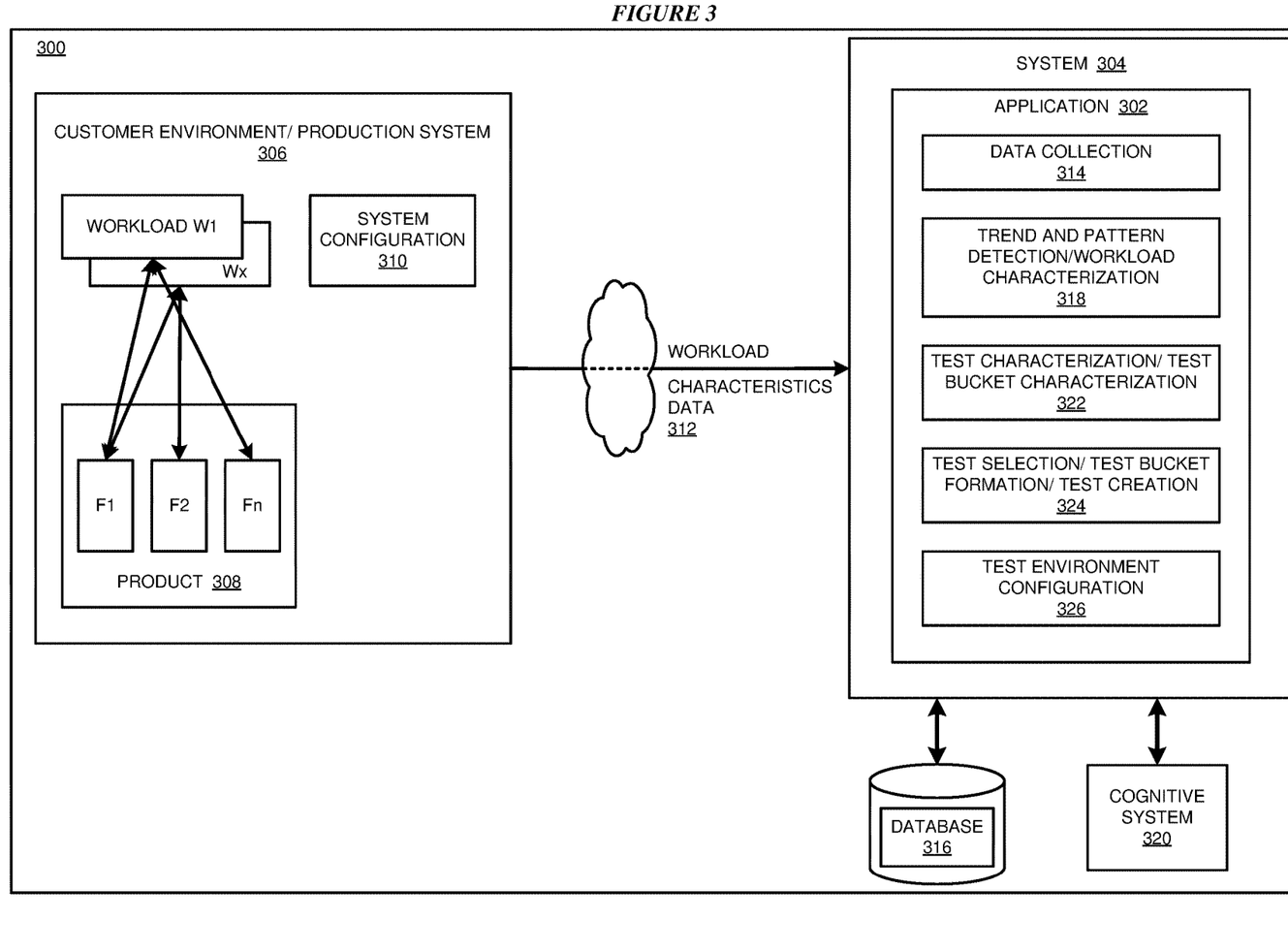
FIG. 3 depicts a block diagram of an example configuration for cognitive testing configuration according to dynamic changes in an install-base of a product in accordance with an illustrative embodiment.

With reference to FIG. 3, this figure depicts a block diagram of an example configuration for cognitive testing configuration according to dynamic changes in an install-base of a product in accordance with an illustrative embodiment. Application 302 is an example of application 105 in FIG. 1. Application 302 executes in system 304, which is an example of server 104 in FIG. 1.

System 306 is an example of system 144 operating in customer environment 140 in FIG. 1. Product 308 is an example of product 146 in FIG. 1. Product 308 includes features F1, F2, . . . Fn. At a given time, workloads W1 . . . Wx are configured to run on system 306 and utilize product 308 and other system resources on system 306.

System 306 is configured according to system configuration 310, which can change from time to time, workload to workload, product execution to product execution, or according to one or more of these and other variables. For example, at one given time, workloads W1 . . . Wx may be executing on system 306 and use product 308 in a compute-intensive tasks. Accordingly, system configuration 310 may enable extra processor resources to be available to product 308 at such time. At another given time, workloads W1 . . . Wy may be executing on system 306 and use product 308 in a data transfer-intensive tasks. Accordingly, system configuration 310 may enable extra networking resources at such time.

These examples of workload characteristics and system configuration are not intended to be limiting. From this disclosure, those of ordinary skill in the art will be able to conceive many other variables, variable-dependent configurations, and configuration changes, and the same are contemplated within the scope of the illustrative embodiments.

An agent (not shown) executing in product 308 or system 306 collects and transmits data 312 to application 302. Data 312 is the workload characteristics data as described herein and is usable for determining patterns and trends in the usage of product 308 in system 306 according to one or more variables such as time and product versions.

Component 314 collects data 312 coming in from one or more systems in the install-base of product 308. Component 314 saves data 312 in structure 316 in a suitable repository.

Component 318 characterizes the workloads, such as workloads W1 . . . Wx, which are using product 308. The characterization of one or more workloads is the detection of one or more patterns and trends in data 312, as described herein. Component 318 performs the workload characterization by using cognitive system 320 for pattern and trend analysis of data 312. In a similar manner, using test data (not shown) which results from previous testing of product 308, component 322 performs test characterization. In other words, component 322 uses cognitive system 320 for pattern and trend analysis of the test data.

Component 324 determines whether a test or test bucket already exists that matches a pattern or a portion thereof that was extracted from data 312 by component 318. If such a test or test bucket exists, component 324 selects it for use in a test bucket that is usable to test product 308 according to the pattern from data 312.

If such a test or test bucket does not exist, component 324 outputs the pattern or the portion thereof so that a new test or test bucket can be created to match the pattern or the portion thereof. Once a collection of existing or newly created tests and/or test buckets is available and selected for all portions of a pattern extracted from data 312, component 324 constructs a new test bucket for testing product 308 according to the pattern.

Optionally, to test a pattern that has been extracted from data 312, the test environment may have to be newly or differently configured. In such cases, component configures the test environment in which the newly constructed test bucket can be executed for testing product 308 according to the pattern.

Figure 4:
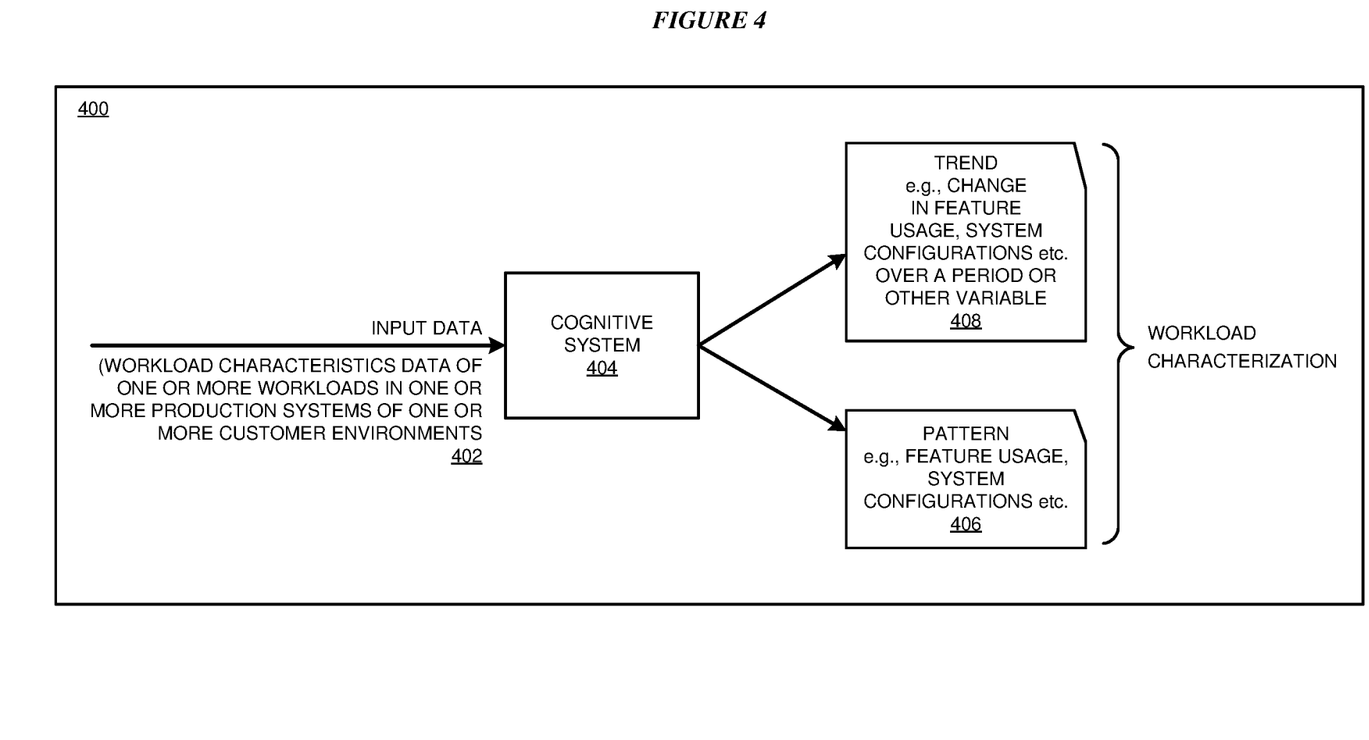
FIG. 4 depicts a block diagram of an example process of workload characterization in accordance with an illustrative embodiment.

With reference to FIG. 4, this figure depicts a block diagram of an example process of workload characterization in accordance with an illustrative embodiment. Process 400 is implemented in component 318 in FIG. 3.

Input data 402 is an example of data 312 in FIG. 3. Cognitive system 404 is an example of cognitive system 320 in FIG. 3. Cognitive system 404 is configured to accept data 402 as input, which includes workload characteristics data of one or more workloads in one or more production systems of one or more customer environments where a product, such as product 308 in FIG. 3, is installed.

A suitably configured pattern detection model in cognitive system 404 outputs one or more pattern 406 detected in data 402. Pattern 406 may be a pattern of product feature usage, a pattern of system configuration during the usage of the product, a pattern of feature combinations or feature sequences being used, a pattern of utilization of a system resource such as processor or memory during product usage, a pattern of types of workloads using the product, a pattern of operations that workloads are presenting to the product, or some combination of these and/or other product-specific or system-specific aspects in a deployment.

A suitably configured trend detection model in cognitive system 404 outputs one or more trend 408 detected in data 402. Trend 408 may be a change in pattern 406 over time or product versions or some other suitable variable. For example trend 408 may be a change over a selected variable in—the pattern of product feature usage, the pattern of system configuration during the usage of the product, the pattern of feature combinations or feature sequences being used, the pattern of utilization of a system resource such as processor or memory during product usage, the pattern of types of workloads using the product, the pattern of operations that workloads are presenting to the product, or some combination of these and/or other product-specific or system-specific aspects in a deployment.

Pattern 406 alone or in combination with trend 408 forms workload characterization of the workloads that are using the product in customer environments.

Figure 5:
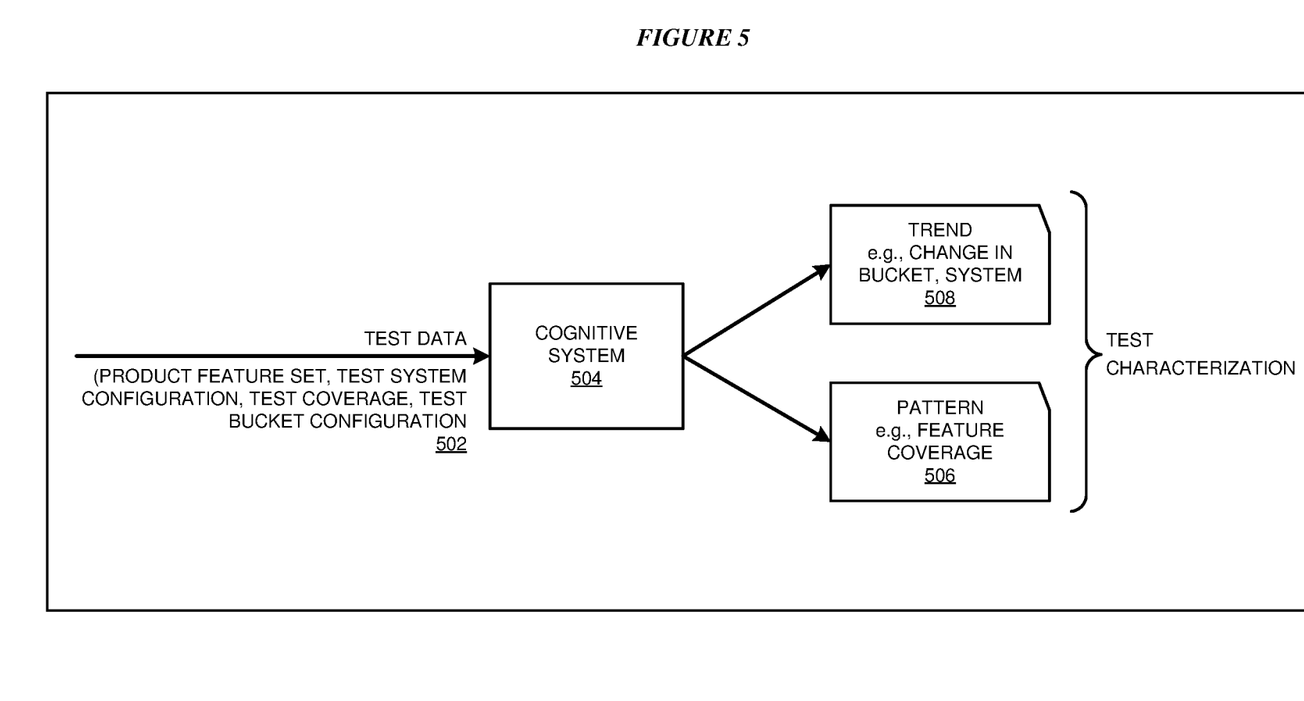
FIG. 5 depicts a block diagram of an example process of test characterization in accordance with an illustrative embodiment.

With reference to FIG. 5, this figure depicts a block diagram of an example process of test characterization in accordance with an illustrative embodiment. Process 500 is implemented in component 322 in FIG. 3.

Input data 502 is an example of test data collected from one or more previous testing of the product. Cognitive system 504 is an example of cognitive system 320 in FIG. 3. Cognitive system 504 is configured to accept data 502 as input, which includes product feature sets in one or more versions of the product, one or more system configurations used during the testing, test coverage information corresponding to one or more tests including one or more test buckets, configurations of one or more test buckets, or some combination of these and other testing-specific information.

A suitably configured pattern detection model in cognitive system 504 outputs one or more pattern 506 detected in data 502. Pattern 506 may be a pattern of product feature exercised, a pattern of system configuration during the testing of the product, a pattern of feature combinations or feature sequences being exercised, a pattern of utilization of a system resource such as processor or memory during product testing, a pattern of types of workloads used to test the product, a pattern of operations that workloads are presenting to the product during the testing, or some combination of these and/or other product-specific or system-specific aspects in a testing environment.

A suitably configured trend detection model in cognitive system 504 outputs one or more trend 508 detected in data 502. Trend 508 may be a change in pattern 506 over time or product versions or some other suitable variable. For example trend 508 may be a change over a selected variable in—the pattern of product feature testing, the pattern of system configuration during the testing of the product, the pattern of feature combinations or feature sequences being tested, the pattern of utilization of a system resource such as processor or memory during product testing, the pattern of types of workloads used to test the product, the pattern of operations that workloads are presenting to the product, or some combination of these and/or other product-specific or system-specific aspects in a testing environment.

Pattern 506 alone or in combination with trend 408 forms test characterization of the tests or test buckets that are used for testing the product in a test environment.

Figure 6:
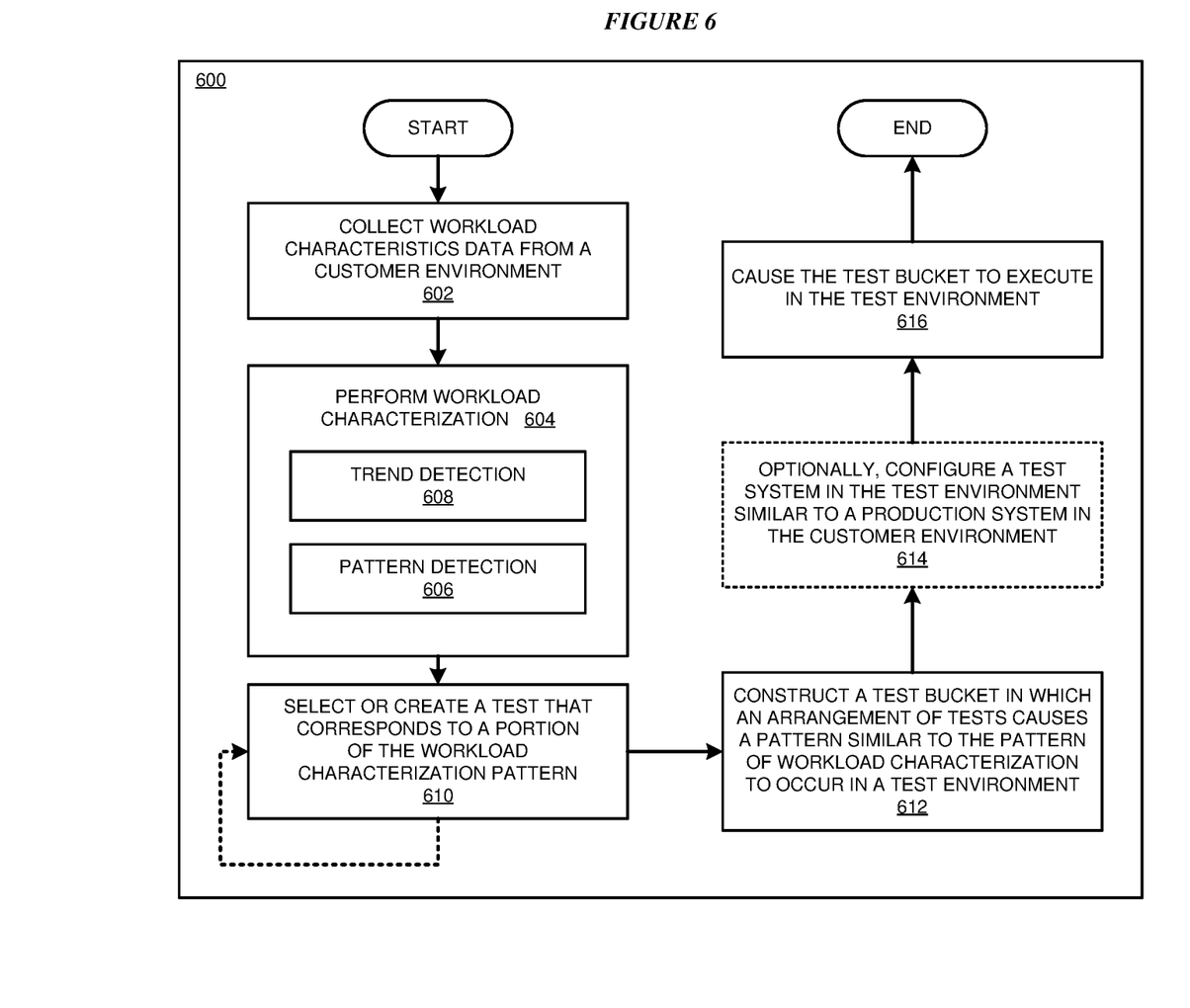
FIG. 6 depicts a flowchart of an example process for cognitive testing configuration according to dynamic changes in an install-base of a product in accordance with an illustrative embodiment.

With reference to FIG. 6, this figure depicts a flowchart of an example process for cognitive testing configuration according to dynamic changes in an install-base of a product in accordance with an illustrative embodiment. Process 600 can be implemented in application 302 in FIG. 3.

The application collects workload characteristics data from a customer environment (block 602). The application performs workload characterization (block 604). Workload characterization of block 604 includes pattern detection 606 and optionally trend detection 608.

For a portion of a detected pattern, select a test or test bucket whose characterization corresponds to the portion within a tolerance (block 610). If the characterization of an existing test or test bucket does not correspond to the portion within the tolerance, the application causes a test or test bucket to be created at block 610 such that the new test or test bucket has a characterization that does correspond to the portion within the tolerance. Block 610 is repeated for as many portions and patterns as may be extracted from a given workload characteristics data.

The application constructs a test bucket from the newly created or existing tests or test buckets whose portion-wise characterizations collectively correspond to a pattern (block 612). Optionally, the application may also cause a test system to be configured similar to the configuration of a production system that is used during a pattern in a customer environment (block 614). The application causes the test bucket constructed in block 612 to execute in a test configuration, which may have been created at block 614 (block 616). The application ends process 600 thereafter.

Thus, a computer implemented method, system or apparatus, and computer program product are provided in the illustrative embodiments for cognitive testing configuration according to dynamic changes in an install-base of a product and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   detecting, in a workload data, a pattern of usage of an aspect of a product in a production system;
   apportioning the pattern into a portion;
   configuring, responsive to a test having a characterization that corresponds to the portion within a tolerance, the test in a test bucket;
   causing the product to be tested using the test bucket, wherein the test bucket comprises a set of tests such that the set of tests collectively correspond to the pattern within the tolerance;
   detecting a trend of change in the pattern;
   forecasting a future pattern, the future pattern being expected in a future workload data; and
   substituting the future pattern as the pattern of usage of the aspect of the product in the production system.

2. The method of claim 1, further comprising:
   configuring a pattern recognition model in a cognitive system to detect the pattern.

3. The method of claim 1, wherein the aspect of the product comprises a sequence in which a combination of features of the product are utilized in the production system.

4. The method of claim 1, wherein the workload data comprises data collected from a plurality of customer environments, wherein the production system is located in one or the plurality of customer environments.

5. The method of claim 1, wherein the portion is an entirety of the pattern.

6. The method of claim 1, further comprising:
   detecting in a test data a test pattern, wherein the test pattern comprises a pattern of testing a set of features of the product in a testing system, wherein the pattern is included in the characterization of the test.

7. The method of claim 6, further comprising:
   configuring a test pattern recognition model in a cognitive system to detect the test pattern.

8. The method of claim 1, further comprising:
   configuring, responsive to no test having a characterization that corresponds to the portion within the tolerance, a new test, wherein the new test has a new characterization that corresponds to the portion within the tolerance; and
   configuring the new test in the test bucket.

9. The method of claim 1, wherein the test is an existing test bucket, wherein the existing test bucket comprises a conditional ordering of a plurality of existing tests.

10. A computer usable program product comprising a computer-readable storage device, and program instructions stored on the storage device, the stored program instructions comprising:
    program instructions to detect, in a workload data, a pattern of usage of an aspect of a product in a production system;
    program instructions to apportion the pattern into a portion;
    program instructions to configure, responsive to a test having a characterization that corresponds to the portion within a tolerance, the test in a test bucket;
    program instructions to cause the product to be tested using the test bucket, wherein the test bucket comprises a set of tests such that the set of tests collectively correspond to the pattern within the tolerance;
    program instructions to detect a trend of change in the pattern;
    program instructions to forecast a future pattern, the future pattern being expected in a future workload data; and
    program instructions to substitute the future pattern as the pattern of usage of the aspect of the product in the production system.

11. The computer usable program product of claim 10, further comprising:
    program instructions to configure a pattern recognition model in a cognitive system to detect the pattern.

12. The computer usable program product of claim 10, wherein the aspect of the product comprises a sequence in which a combination of features of the product are utilized in the production system.

13. The computer usable program product of claim 10, wherein the workload data comprises data collected from a plurality of customer environments, wherein the production system is located in one or the plurality of customer environments.

14. The computer usable program product of claim 10, wherein the portion is an entirety of the pattern.

15. The computer usable program product of claim 10, further comprising:
    program instructions to detect in a test data a test pattern, wherein the test pattern comprises a pattern of testing a set of features of the product in a testing system, wherein the pattern is included in the characterization of the test.

16. The computer usable program product of claim 10, wherein the stored program instructions are stored in a second computer readable storage device in a data processing system, and wherein the stored program instructions are transferred over a network from a remote data processing system.

17. The computer usable program product of claim 10, wherein the stored program instructions are stored in a second computer readable storage device in a server data processing system, and wherein the stored program instructions are downloaded over a network to a remote data processing system for use in a third computer readable storage device associated with the remote data processing system.

18. A computer system comprising a processor, a computer-readable memory, and a computer-readable storage device, and program instructions stored on the storage device for execution by the processor via the memory, the stored program instructions comprising:

program instructions to detect, in a workload data, a pattern of usage of an aspect of a product in a production system;

program instructions to apportion the pattern into a portion;

program instructions to configure, responsive to a test having a characterization that corresponds to the portion within a tolerance, the test in a test bucket;

program instructions to cause the product to be tested using the test bucket, wherein the test bucket comprises a set of tests such that the set of tests collectively correspond to the pattern within the tolerance;

program instructions to detect a trend of change in the pattern;

program instructions to forecast a future pattern, the future pattern being expected in a future workload data; and program instructions to substitute the future pattern as the pattern of usage of the aspect of the product in the production system.

\* \* \* \* \*